(12) United States Patent
Hu

(10) Patent No.: US 11,156,887 B2
(45) Date of Patent: Oct. 26, 2021

(54) DISPLAY PANEL AND DISPLAY APPARATUS

(71) Applicants: HKC CORPORATION LIMITED, Shenzhen (CN); CHONGQING HKC OPTOELECTRONICS TECHNOLOGY CO., LTD., Chongqing (CN)

(72) Inventor: Yunqin Hu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/042,186

(22) PCT Filed: Dec. 10, 2018

(86) PCT No.: PCT/CN2018/119995
§ 371 (c)(1),
(2) Date: Sep. 28, 2020

(87) PCT Pub. No.: WO2020/073470
PCT Pub. Date: Apr. 16, 2020

(65) Prior Publication Data
US 2021/0018807 A1    Jan. 21, 2021

(30) Foreign Application Priority Data
Oct. 8, 2018 (CN) .......................... 201811167008.1

(51) Int. Cl.
*G02F 1/1362* (2006.01)
*G02F 1/1339* (2006.01)

(52) U.S. Cl.
CPC ...... *G02F 1/136286* (2013.01); *G02F 1/1339* (2013.01)

(58) Field of Classification Search
CPC ............. G02F 1/136286; G02F 1/1339; G02F 2001/133388; G02F 1/133388
See application file for complete search history.

(56) References Cited

U.S. PATENT DOCUMENTS

| 2015/0168752 A1* | 6/2015 | Shih | ...................... G02F 1/1368 349/123 |
| 2016/0195741 A1* | 7/2016 | Shiau | ...................... G02F 1/1337 349/106 |
| 2017/0104006 A1* | 4/2017 | Ma | .......................... H01L 27/127 |

FOREIGN PATENT DOCUMENTS

| CN | 102236208 A | 11/2011 |
| CN | 103033989 A | 4/2013 |

(Continued)

OTHER PUBLICATIONS

Yulin Li, the ISA written comments, dated Jun. 2019, CN.
Yulin Li, the International Search Report, dated Jun. 2019, CN.

*Primary Examiner* — Mariam Qureshi

(57) ABSTRACT

This application discloses a display panel and a display apparatus. The display panel includes a display area, a seal, a first metal wire, a signal line, a channel and a retaining wall. The seal is correspondingly arranged in a nondisplay area of the display panel. The first metal wire is correspondingly arranged between the display area and the seal. The signal line bridges over the first metal wire and is fed into the display area. The channel is located at a bridging connection position of the first metal wire and the signal line. The retaining wall is arranged at a position corresponding to the channel, beside the first metal wire.

18 Claims, 3 Drawing Sheets

(56) References Cited

FOREIGN PATENT DOCUMENTS

| | | |
|---|---|---|
| CN | 106154652 A | 11/2016 |
| CN | 205881903 U | 1/2017 |
| CN | 107561802 A | 1/2018 |
| JP | 2002350873 A | 12/2002 |
| KR | 20160129278 A | 11/2016 |

\* cited by examiner

DISPLAY PANEL AND DISPLAY APPARATUS

CROSS REFERENCE OF RELATED APPLICATIONS

This application claims the priority to the Chinese Patent Application No. CN201811167008.1 filed with National Intellectual Property Administration, PRC on Oct. 8, 2018 and entitled "DISPLAY PANEL AND DISPLAY APPARATUS", which is incorporated herein by reference in its entirety.

TECHNICAL FIELD

This application relates to the field of display technologies, and in particular, to a display panel and a display apparatus.

BACKGROUND

It should be understood that descriptions herein merely provide background information related to this application, and do not necessarily constitute the prior art.

With the development and advancement of technologies, liquid crystal displays have been widely used due to many advantages such as a thin body, power saving and no radiation. Most of liquid crystal displays on the market are backlight-type liquid crystal displays, including liquid crystal panels and backlight modules. The liquid crystal panel includes a color filter substrate (also referred to as a CF Substrate), a thin film transistor substrate (TFT Substrate) and a mask, and transparent electrodes exist on the opposite inner sides of the above substrate. A layer of liquid crystal (LC) molecules is sandwiched between two substrates.

With the advancement of the technologies and requirements of large-scale production, an ink-jet printer is developed and used. Alignment liquid dropped in the ink-jet printer is a droplet, which has a viscosity lower than that of a roller printer, and is higher in flowability.

A display panel is often designed with a signal line that bridges over a first metal wire and is fed into a display area. A channel may be formed at a bridging connection position, and the alignment liquid on a thin film transistor side will overflow along the channel. When the alignment liquid is overlapped with a seal, poor contact of the seal may be caused, which affects the process yield.

SUMMARY

The present invention provides a display panel and a display apparatus, so as to prevent overflow of alignment liquid.

The present invention provides a display panel, comprising:
 a seal, correspondingly arranged in a nondisplay area of the display panel, The nondisplay area surrounds a whole display area; a first metal wire, correspondingly arranged between the display area and the seal; a signal line, bridging, over the first metal wire and fed into the display area; a channel, located at a bridging connection position of the first metal wire and the signal line; and a retaining wall, arranged at a position, corresponding to the channel, beside the first metal wire.

Optionally, at least one first metal wire is provided, and the retaining wall is parallel to the first metal wire.

Optionally, a wire width of a position, corresponding to the retaining wall, of the first metal wire is reduced.

Optionally, the channel includes a first opening, and the retaining wall is arranged at the first opening, close to the display area, of the channel.

Optionally, the channel includes a second opening, and the retaining wall is arranged at the second opening, close to the seal, of the channel.

Optionally, the retaining wall is made of metal.

Optionally, the retaining wall may be a single-layer retaining wall.

Optionally, the retaining wall includes at least two layers of sub-retaining walls, and the two adjacent layers of sub-retaining walls are stacked.

Optionally, the retaining wall is arranged on the first metal wire.

Optionally, the surface of the retaining wall is higher than the surface of the first metal wire.

Optionally, the retaining wall is of a long-strip shape, and a width of the retaining wall is equal to a width of the channel.

Optionally, the retaining wall is of a long-strip shape, and a width of the retaining wall is greater than a width of the channel.

This application further discloses a display panel. The display panel includes a display area, a seal, a first metal wire, a signal line, a channel and a retaining wall. The seal is correspondingly arranged in a nondisplay area of the display panel. The nondisplay area surrounds the whole display area. The first metal wire is correspondingly arranged between the display area and the seal. The signal line bridges over the first metal wire and is fed into the display area. The channel is located at a bridging connection position of the first metal wire and the signal line. The retaining wall is arranged at a position, corresponding to the channel, beside the first metal wire. At least one first metal wire is provided, and the retaining wall is parallel to the first metal wire. The retaining wall is arranged at a first opening, close to the display area, of the channel and a second opening, close to the seal, of the channel. A wire width of a position, corresponding to the retaining wall, of the first metal wire is reduced. The retaining wall is made of metal. The retaining wall is higher than the first metal wire. A width of the retaining wall is greater than a width of the channel.

This application, further discloses a display apparatus. The display apparatus includes display panels. The display panel includes:
 a display area;
 a seal, correspondingly arranged in a nondisplay area of the display panel, The nondisplay area surrounds the whole display area;
 a first metal wire, correspondingly arranged between the display area and the seal;
 a signal line, bridging over the first metal wire and fed into the display area;
 a channel, located at a bridging connection position of the first metal wire and the signal line; and
 a retaining wall, arranged at a position, corresponding to the channel, beside the first metal wire.

Optionally, at least one first metal wire is provided, and the retaining wall is parallel to the first metal wire.

Optionally, a wire width of a position, corresponding to the retaining wall, of the first metal wire is reduced.

Optionally, the channel includes a first opening, and the retaining wall is arranged at the first opening, close to the display area, of the channel.

Optionally, the channel includes a second opening, and the retaining wall is arranged at the second opening, close to the seal, of the channel.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Apparently, the accompanying drawings, in the following, descriptions are merely some embodiments of this application, and a person of ordinary skill in the art can also obtain other accompanying drawings according to these accompanying drawings without involving any creative effort. In the accompanying drawings.

DETAILED DESCRIPTION OF EMBODIMENTS

Figure 1:
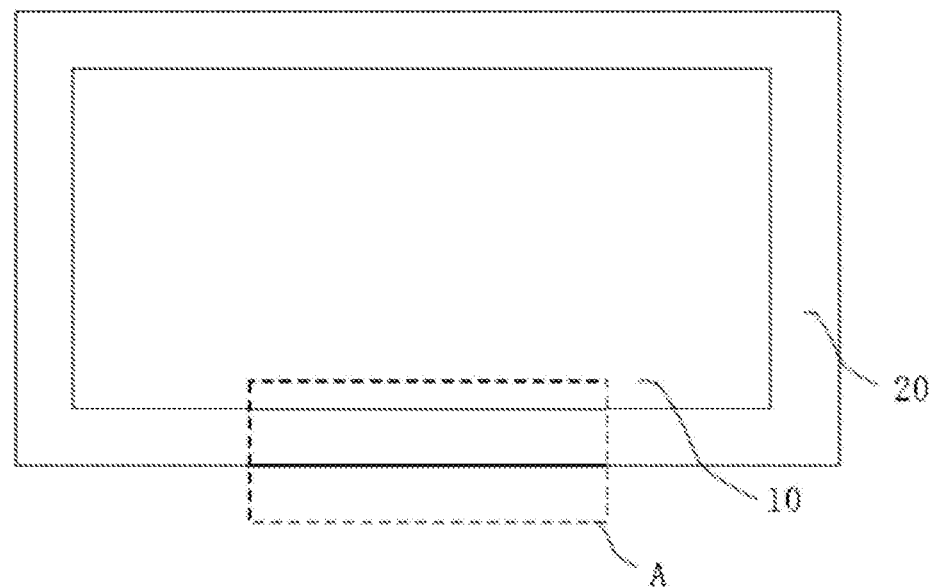
FIG. 1 is a top view of a frame structure of a display panel according to an embodiment of the present invention.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly includes one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, and/or operations, but do not preclude the presence or addition of one or more other features, integers, steps, operations, and/or combinations thereof.

Exemplary low-generation linear alignment liquid is applied by a roller printer. Later, with the advancement of the technologies and requirements of large-scale production, an ink jet printer is developed and used. An alignment liquid dropped in the ink-jet printer is a droplet, which has a viscosity lower than that of the roller printer, and is higher in flowability.

A display panel is often designed with a signal line that bridges over a common line and is fed into a display area. A channel may be formed at a bridging connection position, and the alignment liquid on an array switch side will overflow along the channel. When the alignment liquid is overlapped with a seal, poor contact of the seal may be caused, which affects the process yield.

This application is further described below with reference to the accompanying drawings and embodiments.

Figure 2:
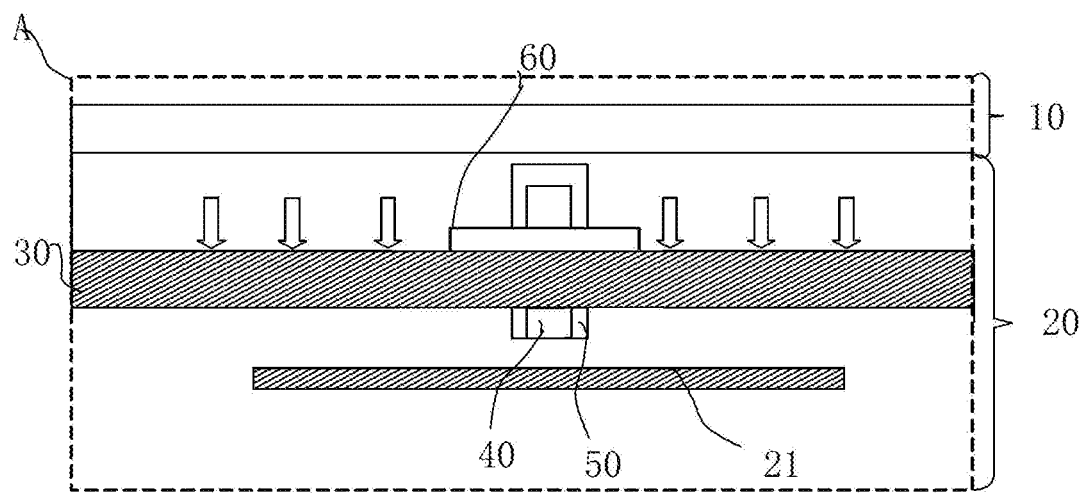
FIG. 2 is a top view of a part A according to another embodiment of the present invention.

As shown in FIGS. 1 to 2, the embodiment of the present invention discloses a display panel, including:

a seal 21, correspondingly arranged in a nondisplay area 20 of the display panel, the nondisplay area 20 surrounds a whole display area 10; a first metal wire 30, correspondingly arranged between the display area 10 and the seal 21; a signal line 40, bridging over the first metal wire 30 and fed into the display area 10; a channel 50, located at a bridging connection position of the first metal wire 30 and the signal line 40; and a retaining wall 60, arranged at a position, corresponding to the channel 50, beside the first metal wire 30.

In this solution, a signal transmitted by the signal line is fed into the display area through the first metal wire. The channel appears at the bridging connection position, and alignment liquid may flow into the channel. The retaining wall is arranged in the channel and fills a gap of the channel, thereby effectively avoiding loose adhesion of a substrate caused by overlapping of the overflowing alignment liquid and the seal.

In one or more embodiments, the first metal wire includes a common line. The common line is functioned to serve as a common electrode for providing a reference voltage shared by liquid crystal capacitors. The signal line includes a repair line for transmitting a signal for repairing a line. Certainly, the signal line may also be a control signal line such as a scanning line, a data line or a clock signal line. The first metal wire may also be other lines overlapped with the signal line.

As shown in FIG. 2, in one or more embodiments, at least one first metal wire 30 is provided, and the retaining wall 60 is parallel to the first metal wire 30.

In this solution, the retaining wall 60 is parallel to the first metal wire 30, so that the alignment liquid is blocked more thoroughly. If the retaining wall 60 is not parallel to the first metal wire 30, the alignment liquid easily flows into the gap and overflows into the channel 50, so the blocking effect is not as direct as the blocking effect in the situation that the retaining wall 60 is parallel to the first metal wire 30.

Figure 4:
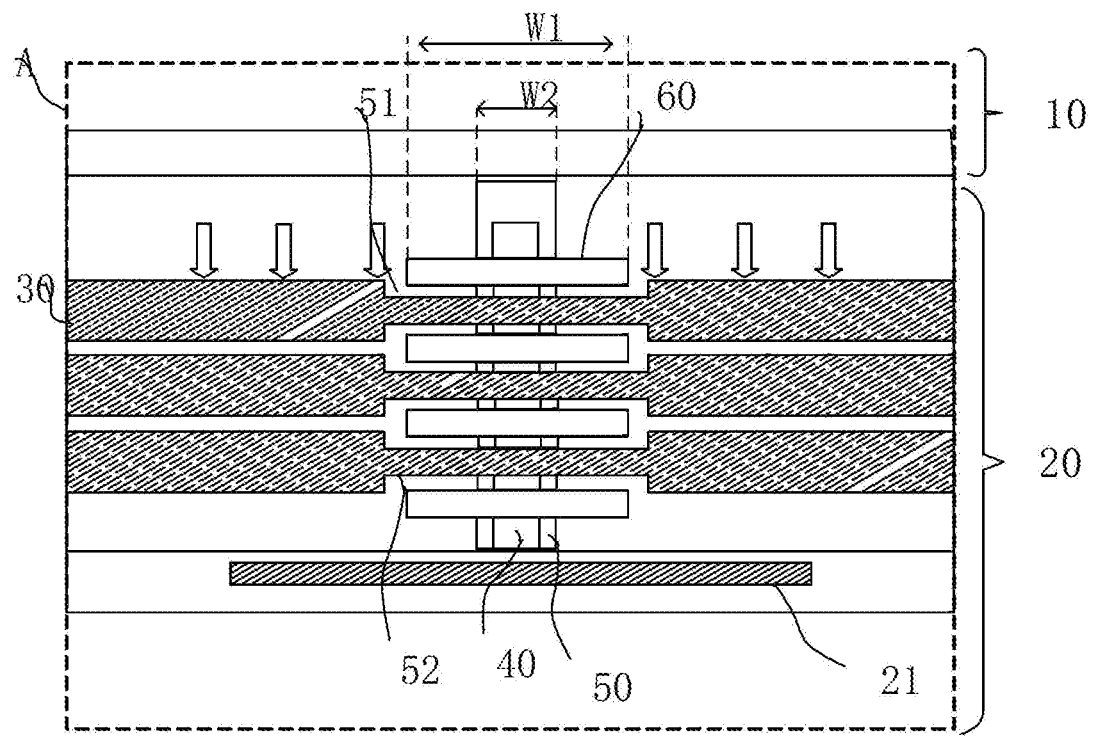
FIG. 4 is a top view of a part A according to another embodiment of the present invention.
Figure 5:
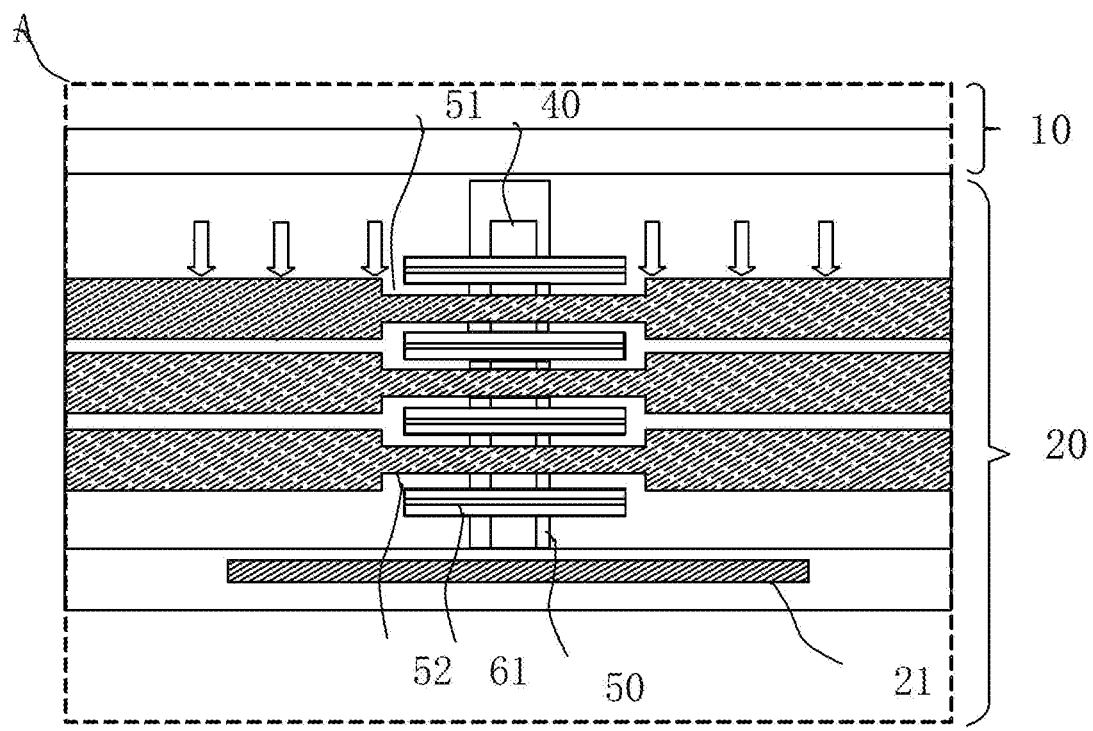
FIG. 5 is a top view of a part A according to another embodiment of the present invention.

As shown in FIGS. 4 to 5, in one or more embodiments, at least three first metal wires 30 are provided, and retaining walls 60 are arranged between every two adjacent first metal wires 30. The two adjacent retaining walls 60 are parallel to each other.

In this solution, the retaining walls 60 are arranged between the two adjacent first metal wires 30 to achieve layer-by-layer blocking, so that the blocking effect is good, the protective strength is higher, and the alignment liquid will not overflow.

Figure 3:
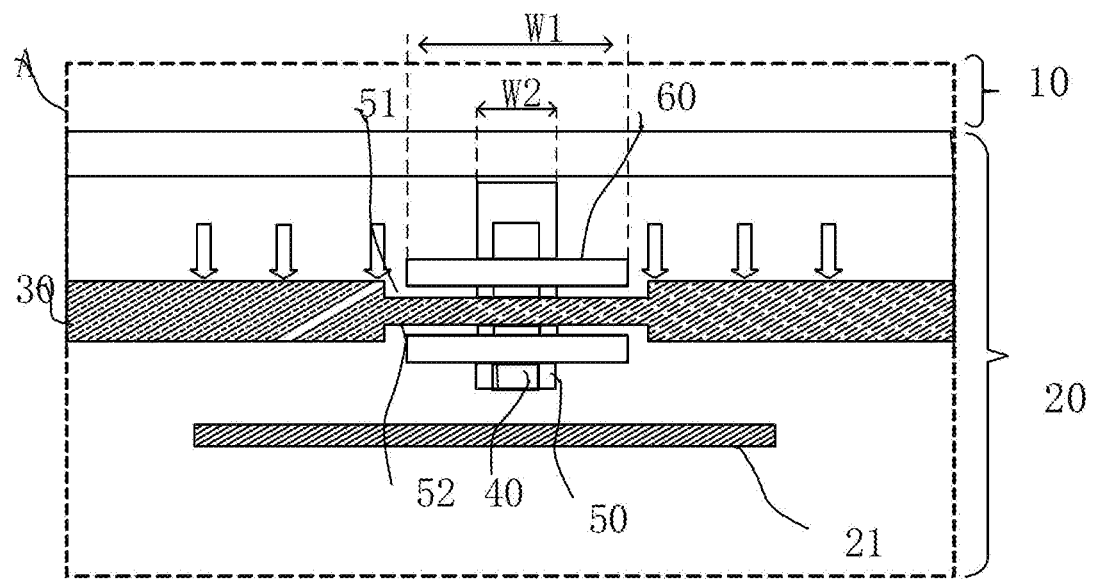
FIG. 3 is a top view of a part A according to another embodiment of the present invention.

As shown in FIG. 3, in one or more embodiments, a wire width of a position, corresponding to the retaining wall 60, of the first metal wire 30 is reduced.

In this solution, the wire width of the position, corresponding to the retaining wall 60, of the first metal wire 30 is reduced to avoid the retaining wall and allow the retaining wall 60 to be partially overlapped with the first metal wire and the channel, so that the retaining wall has a thickness, and the alignment liquid will not overflow into the channel, which plays a high-strength blocking role.

As shown in FIG. 3, in one or more embodiments, the channel 50 includes a first opening 51, and the retaining wall 60 is arranged at the first opening 51, close to the display area 10, of the channel 50.

In this solution, the retaining wall 60 is arranged at the first opening 51, close to the display area 10, of the channel 50, namely at an inlet of the channel 50, and a flowing direction of the alignment liquid is from the display area to the inlet of the channel 50. A guard is arranged at the source, so that the protectiveness is higher, and the alignment liquid is blocked outside the opening and has no chance to enter the channel 50.

As shown in FIG. 3, in one or more embodiments, the channel 50 includes a second opening 52, and the retaining wall 60 is arranged at the second opening 52, close to the seal 21, of the channel 50.

In this solution, the retaining wall 60 is arranged at the second opening 52, close to the seal 21, of the channel 50. The second opening 52 is the most important last gate, and is equivalent to an outlet away from one end of the display area. Due to a certain viscosity, the alignment liquid is continuously adhered to a contact surface in a flowing process, so that less and less alignment liquid may flow. Therefore, the retaining wall 60 is arranged at the end away from an alignment liquid source. Under the same condition, the amount of the alignment liquid blocked will be correspondingly reduced, so that requirements for a thickness, a width, etc. of the retaining wall 60 may be properly lowered to reduce the process difficulty and facilitate the construction.

In one or more embodiments, the retaining wall 60 is made of metal.

In this solution, the signal line 40 is a metal which is consistent with the material of the retaining wall 60, so that the signal line and the retaining wall may be manufactured simultaneously thanks to the same material, that is, there is no need to manufacture the retaining wall 60 in another manufacturing procedure. The manufacturing procedure is simple.

As shown in FIG. 2, in one or more embodiments, the retaining wall 60 may be a single-layer retaining wall 60.

In this solution, the single-layer retaining wall may save raw materials, and the manufacturing process is also simple, thus reducing the manufacturing procedures.

Figure 6:
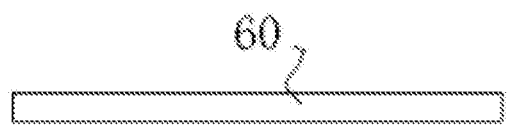
FIG. 6 is a top view of details of a retaining wall according to another embodiment of the present invention.
Figure 7:
FIG. 7 is a top view of details of a retaining wall according to another embodiment of the present invention.

As shown in FIGS. 5 to 7, in one or more embodiments, the retaining wall 60 includes at least two layers of sub-retaining walls 61, and the two adjacent layers of sub-retaining walls 61 are stacked.

In this solution, if the quantity of layers of the stacking retaining wall 60 is larger, the height of the retaining wall 60 is increased, and the alignment liquid is not liable to climb over the retaining wall 60, so that the blocking effect is enhanced. The more the layers, the tighter the retaining wall 60, which also increases the intensity of the retaining wall 60.

As shown in FIG. 2, in one or more embodiments, the retaining wall 60 is arranged on the first metal wire 30.

In this solution, the retaining wall 60 is not overlapped with the first metal wire 30, but directly presses the first metal wire 30, which not only blocks the alignment liquid, but also saves a process and reduces the manufacturing procedure for the first metal wire 30.

As shown in FIG. 2, in one or more embodiments, the surface of the retaining wall 60 is higher than the surface of the first metal wire 30.

In this solution, the retaining wall 60 is higher than the first metal wire 30, which prolongs the path of the channel 50. The retaining wall 60 above the first, metal wire 30 may cause the alignment liquid to not contact the inlet of the channel 50, so that overflowing of the alignment liquid is blocked.

In one or more embodiments, a width of the retaining wall is equal to a width of the channel 50.

In this solution, the retaining wall 60 is of a long-strip shape, and has the same width, which reduces the gaps between the retaining wall 60 and two side walls of the channel 50 and reduces the possibility that the alignment liquid overflows from the gaps on two sides. In addition, under the condition that the width of the channel 50 is limited, the width of the retaining wall 60 is maximized, so that a passing distance of the alignment liquid in the channel 50 is maximized, and the alignment liquid is further blocked from passing through the channel 50 by full contact adhesion between the alignment liquid and the retaining wall 60.

As shown in FIG. 3, in one or more embodiments, a width of the retaining wall 60 is greater than a width of the channel 50.

In this solution, the retaining wall 60 is of a long-strip shape. The width of the retaining wall is W1, and the width of the channel is W2. The width of the channel is a width of an opening, corresponding to the channel, of the first metal wire. The width, of the retaining wall is greater than the width of the channel, so that the gap between the two side walls of the channel 50 is completely covered, and the alignment liquid is completely blocked from overflowing. Distances that two ends of the retaining wall 60 exceed the channel 50 may reduce the flow velocity of the alignment liquid in a process that the alignment liquid seeps along the edges of the two side walls of the retaining wall 60, so that the alignment liquid is blocked before it reaches the channel 50, and the longer the retaining wall 60, the larger the protective section.

Referring to FIGS. 1 to 3, another embodiment of the present invention discloses a display panel, including a display area 10, a nondisplay area 20, a seal 21, a first metal wire 30, a signal line 40, a channel 50 and a retaining wall 60. The seal 21 is correspondingly arranged in the nondisplay area 20 of the display panel. The nondisplay area 20 surrounds the whole display area 10. The first metal wire 30 is correspondingly arranged between the display area 10 and the seal 21. The signal line 40 bridges over the first metal wire 30 and is fed into the display area. The channel 50 is located at a bridging connection position of the first metal wire 30 and the signal line 40. The retaining wall 60 is arranged at a position, corresponding to the channel 50, beside the first metal wire 30. At least one first metal wire 30 is provided, and the retaining wall 60 is parallel to the first metal wire 30. The retaining wall 60 is arranged at a first opening, close to the display area, of the channel 50 and a second opening, close to the seal 21, of the channel 50. A wire width of a position, corresponding to the retaining wall 60, of the first metal wire 30 is reduced. The retaining wall 60 is made of metal. The retaining wall 60 is higher than the first metal wire 30. A width of the retaining wall 60 is greater than a width of the channel 50.

In this solution, a signal transmitted by the signal line 40 is fed into the display area through the first metal wire 30. The channel 50 appears at the bridging connection position, and alignment liquid may flow into the channel 50. The retaining wall is arranged beside the first metal wire 30 and overlapped with the channel and the first metal wire, fills a gap of the channel 50, and is good in blocking effect. The retaining wall 60 is arranged at the first opening 51, close to the display area, of the channel 50, namely at an inlet of the channel 50, so that a guard is arranged at the source to make protectiveness higher, and the alignment liquid is blocked outside the opening and has no chance to enter the channel 50. The retaining wall 60 is arranged at the second opening 52, close to the seal 21, of the channel 50. The second opening 52 is the most important last gate, and is equivalent to an outlet away from one end of the display area 10. Due to a certain viscosity, the alignment liquid is continuously adhered to a contact surface in a flowing process, so that less and less alignment liquid may flow. Therefore, the retaining wall 60 is arranged at the end away from an alignment liquid source. Under the same condition, the amount of the alignment liquid blocked will be correspondingly reduced, so that requirements for a thickness, a width, etc. of the retaining wall 60 may be properly lowered to reduce the process difficulty and facilitate the construction. The wire width is reduced, and the retaining wall is overlapped with the first metal wire, so that the blocking effect is good. The signal line 40 is a metal which is consistent with the material of the retaining wall 60, so that the signal line and the retaining wall may be manufactured simultaneously thanks to the same material, that is, there is no need to manufacture the retaining wall 60 in another manufacturing procedure. The manufacturing procedure is simple. The retaining wall 60 is higher than the first metal wire 30, which prolongs the path of the channel 50. The retaining wall 60 above the first metal wire 30 may cause the alignment liquid to not contact the inlet of the channel 50. The retaining wall 60 is of a long-strip shape, and the width of the retaining wall 60 is greater than the width of the channel 50, so that the gap between the two side walls of the channel 50 is completely covered, and the alignment liquid is completely blocked from overflowing. Distances that two ends of the retaining wall 60 exceed the channel 50 may reduce the flow velocity of the alignment liquid in a process that the alignment liquid seeps along the edges of the two side walls of the retaining wall 60, so that the alignment liquid is blocked before it reaches the channel 50, and the longer the retaining wall 60, the larger the protective section. Poor contact of the seal 21 caused by the overlapping between the overflowing alignment liquid and the seal 21 is effectively avoided.

As shown in FIGS. 1 to 7, another embodiment of this application discloses a display apparatus. The display apparatus includes the above display panel.

The panel of this application may be a Twisted Nematic (TN) panel, an In-Plane Switching (IPS) panel, or a Multi-domain Vertical Alignment (VA) panel, and may certainly be any other suitable type of panel.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:
1. A display panel, comprising:
a display area;
a seal, correspondingly arranged in a nondisplay area of the display panel, wherein the nondisplay area surrounds the whole display area;
at least one first metal wire, correspondingly arranged between the display area and the seal;
a signal line, bridging over the first metal wire and fed into the display area;
a channel, located at a bridging connection position of the at least one first metal wire and the signal line; and
a retaining wall, arranged at a position, corresponding to the channel, beside the at least one first metal wire;
wherein a wire width of a position, corresponding to the retaining wall, of the at least one first metal wire is reduced:
wherein the at least one first metal wire is narrowed inward on both sides in proximity to the display area and away from the display area at the position of the first metal wire corresponding to the retaining wall, forming a recess at each of the both sides of the first metal wire at the position of the first metal wire corresponding to the retaining wall.

2. The display panel according to claim 1, wherein the retaining wall is parallel to the at least one first metal wire.

3. The display panel according to claim 2, wherein the retaining Fall is arranged on the at least one first metal wire.

4. The display panel according to claim 1, wherein the channel comprises a first opening and the retaining wall is arranged at the first opening, close to the display area, of the channel.

5. The display panel according to claim 1, wherein the channel comprises a second opening, and the retaining wall is arranged at the second opening, close to the seal, of the channel.

6. The display panel according to claim 1, wherein the retaining wall is made of metal; the retaining wall comprises at least two layers of sub-retaining walls; and the two adjacent layers of sub-retaining walls are stacked.

7. The display panel according to claim 1, wherein the surface of the retaining wall is higher than the surface of the at least one first metal wire.

8. The display panel according to claim 1, wherein a width of the retaining wall is greater than or equal to a width of the channel.

9. The display panel according to claim 1, wherein the retaining wall is of a long-strip shape.

10. The display panel according to claim 1, wherein a width of the retaining wall is the same as a width of the channel.

11. The display panel according to claim 1, wherein the retaining wall is made of metal.

12. The display panel according to claim 1, wherein the retaining wall may be a single-layer retaining wall.

13. The display panel according to claim 1, wherein the retaining wall is provided at the recess defined at each of the both sides of the at least one first metal wire at the position of the first metal wire corresponding to retaining wall, and wherein adjacent first metal wires share a common retaining wall.

14. The display panel according to claim 13, wherein one of the retaining walls is disposed between the seal and the corresponding first metal wire nearest to the seal.

15. The display panel according to claim 13, comprising three first metal wires, and four retaining walls that are arranged corresponding to the channel and that are alternately arranged with the first metal wires.

16. The display panel according to claim 13, wherein each of the retaining walls has a thickness measured perpendicular to the length of the respective first metal wire that is greater than the thickness of the corresponding recess measured perpendicular to the length of the respective first metal wire, and a length measured along the length of the respective first metal wire that is less than the length of the recess measured along the length of the respective first metal wire.

17. The display panel according to claim 1, wherein the signal line is made of the same material and in the same manufacturing procedure as the retaining wall.

18. A display apparatus, the display apparatus comprising a display panel, wherein the display panel comprises:
   a display area;
   a seal, correspondingly arranged in a nondisplay area of the display panel, wherein the nondisplay area surrounds the whole display area;
   at least one first metal wire, correspondingly arranged between the display area and the seal;
   a signal line, bridging over the at least one first metal wire and fed into the display area;
   a channel, located at a bridging connection position of the at least one first metal wire and the signal line; and
   a retaining wall, arranged at a position, corresponding, to the channel, beside the at least one first metal wire;
   wherein a wire width of a position, corresponding to the retaining wall, of the at least one first metal wire is reduced:
   wherein the at least one first metal wire is narrowed inward on both sides in proximity to the display area and away from the display area at the position of the first metal wire corresponding to the retaining wall, forming a recess at each of the both sides of the first metal wire at the position of the first metal wire corresponding to the retaining wall.

* * * * *